Figure 1B:
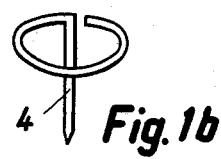

May 19, 1964

H. MUTH 3,133,537 pH-MEASURING ENDO-RADIOSONDE

Filed May 12, 1961

Herbert Muth
Inventor
by: George H. Spencer
Attorney

United States Patent Office 3,133,537
Patented May 19, 1964

3,133,537
pH-MEASURING ENDO-RADIOSONDE
Herbert Muth, Neu-Ulm-Offenhausen, Germany, assignor to Telefunken Patentverwertungs-G.m.b.H., Ulm (Danube), Germany
Filed May 12, 1961, Ser. No. 109,747
Claims priority, application Germany May 19, 1960
10 Claims. (Cl. 128—2)

The present invention relates generally to a miniature transmitter construction, and more particularly to a transmitter in pill form that may be swallowed, hereinafter referred to as an endo-radiosonde, for measuring the pH value or other condition in the stomach and/or the intestines of a patient.

Devices of this type have been previously known and used. They are useful in the medical field since in addition to measuring the pure pH value, they aid a doctor in determining, e.g., activity of the stomach, from a consideration of the measured pH values as recorded over a period of time by being sent from the transmitter to the receiver. The measuring of the pH value by means of such known transmitters is accomplished by transmitting the measured value to an appropriately designed receiver. A battery is provided to operate the transmitter circuit, which battery has two electrodes arranged in an electrolyte as well as at least one external electrode for measuring the pH value. In addition, a semi-permeable layer is provided to cover the battery.

It has heretofore been known to use one electrode of the battery as a part of the pH measuring assembly. Experience has shown, however, that the electrodes of the battery may not be arranged at random with respect to the semi-permeable layer, since this may produce erroneous measurements.

Accordingly, it is a primary object of the present invention to provide an arrangement for the battery electrodes of an endo-radiosonde wherein one battery electrode aids in measuring the pH value and is disposed in such a relationship to the semi-permeable layer that sources of error due to improper positioning of electrodes are eliminated.

According to the invention a pH measuring assembly is provided and includes an additional electrode disposed externally of the transmitter housing, as well as one of the battery electrodes which thus assumes a dual function. The battery chamber in the housing is covered with a semi-permeable layer which covers the battery electrodes. Therefore, this dual purpose electrode is arranged near the semi-permeable wall, while the other electrode is further away from it. The advantage of this electrode arrangement is that erroneous pH measurements are avoided. Practical tests have confirmed that with this arrangement the sources of error which would accompany random electrode placement are completely eliminated and that the frequency variations through the pH measuring assembly are greater than would otehwise be obtained.

Figure 1C:
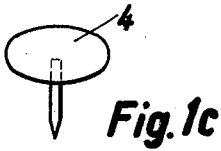
Figure 1A:
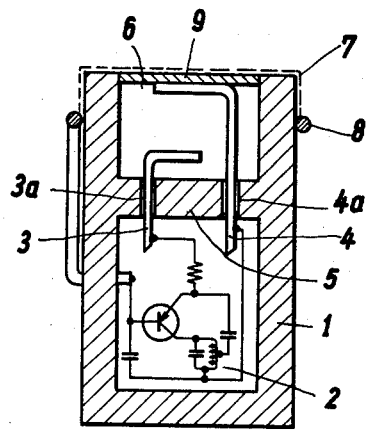
Figure 2:
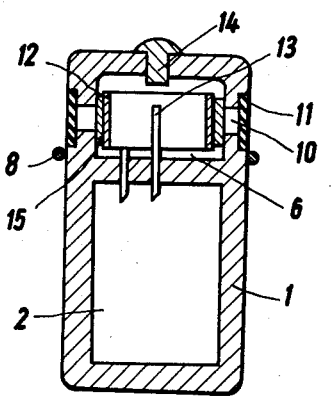

Additional objects and advantages of the present invention will become apparent upon consideration of the following description when taken in conjunction with the accompanying drawings in which:

FIGURE 1a is a vertical section partially diagrammatic through a sonde in pill form.
FIGURE 1b is a perspective view of one form of the dual purpose electrode.
FIGURE 1c is a perspective view of another form of the dual purpose electrode.
FIGURE 2 is a vertical section through another form of sonde.

Referring now to the drawing, and FIGURE 1a thereof in particular, the housing 1 of the sonde has a chamber 2 which accommodates the circuit components necessary for the transmitter circuit. An embodiment of a transmitter circuit is diagrammatically shown within chamber 2. Since the circuit is known and does not have any direct connection with the present invention, no detailed explanation thereof is needed. Two battery electrodes 3 and 4 project into the chamber 2. Electrode 3 may be a magnesium electrode while electrode 4 may be of silver chloride. Through interior partition wall 5 of the housing, openings 3a and 4a are provided for the electrodes 3 and 4. The chamber 6 is the battery chamber of the sonde. It is filled with a suitable electrolytic fluid so that the battery may operate the sonde.

This chamber is sealed off from the exterior by a semi-permeable layer 7 shown as a dashed line. This layer may, for example, be a film of appropriate material stretched over the upper part of the sonde. After the chamber 6 has been filled with electrolyte the two electrodes deliver a constant voltage at their output terminals suitable for operating the transmitter circuit.

The pH measuring assembly of the sonde is formed by the electrode 8 having an annular portion arranged outside the housing, which electrode 8 may be made out of antimony, and by the silver chloride electrode 4 of the battery. A voltage is generated when electrode 8 becomes wet, the amplitude of which voltage depends upon the pH value of the fluid wetting the electrode 8. This voltage is used in the transmitter circuit for controlling the transmitting frequency, thus making possible the transmission of the measured result.

The dual purpose electrode is arranged near the semi-permeable wall, while the other electrode lies farther away from it. This guarantees a coordination of the electrode 4 with the electrode 8, thus eliminating sources of error.

An absorbent layer 9, such as a piece of blotting paper, is disposed along the semi-permeable wall 7 on the battery side. This is done for the following reason: before using the sonde for examination, the electrolyte must be placed into the battery chamber. This is done by any suitable means such as an injection syringe. But it is very difficult to fill completely the chamber provided for the electrolyte. In practice, there always remains a small space where there is no electrolytic fluid. In the position of the sonde shown, however, the electrolytic fluid would then no longer wet the semi-permeable membrane 7, which would result in their being no pH measuring at all or an erroneous measuring. In order to guarantee a continuous wetting of the semi-permeable layer, an absorbent layer is placed onto this semi-permeable layer. This is done most simply by using a piece of blotting paper. Thus, this source of error is also eliminated.

The electrode 4 may be arranged so close to the semi-permeable layer that the absorbent layer is clamped between the electrode and the semi-permeable layer, as is shown in the drawing. Preferably, this electrode is arcuate in shape in a plane parallel to the absorbent layer, such as annular or ring-shaped (shown in perspective in FIGURE 1b) or disk-shaped (shown in perspective in FIGURE 1c) so that the absorbent layer is kept in its position by the large surface of the electrode.

The above-described sonde may be modified. Thus, for example, the head part of the sonde, sealed off in the drawing by the semi-permeable wall 7, may be sealed off by a solid wall. Such an arrangement is shown in FIGURE 2. In this case, one or several openings 10 are provided in the cylindrical housing part bordering the battery chamber. The semi-permeable wall 11 is then disposed around this cylindrical part of the housing, and thus around the upper third of the sonde shown in FIGURE 2. In this embodiment, the one electrode 12, namely, the silver chloride electrode, is then designed as a cylindrical surface or as a portion thereof, and is arranged near the cylinder wall. If the electrode 12 is designed as a complete cylindrical surface, the electrode 13 is disposed approximately along the axis of the battery chamber. In this case, too, if the cylindrical parts are brought appropriately close to one another, an absorbent layer may be placed between the electrode having the shape of a cylindrical surface and the cylindrical housing wall. The opening closed by the stopper 14 serves here for filling the electrolyte into the battery chamber. An absorbent layer 15 is here likewise put between the housing wall and the electrode 12.

It will be understood that the above description of the present invention is susceptible to various modifications, changes, and adaptations, and the same are intended to be comprehended within the meaning and range of equivalents of the appended claims.

What is claimed is:

1. An endo-radiosonde for measuring the pH value in the stomach and/or intestines of a patient and transmitting the measured value to a receiver, said sonde comprising, in combination: a housing; a transmitter circuit in said housing; a battery in the housing and having two electrodes arranged in an electrolyte for delivering a voltage necessary for operating said transmitter circuit; a pH measuring assembly including a further electrode arranged outside the housing and wettable by intestinal fluids; a semi-permeable layer forming one external wall of the battery; one electrode of the battery forming part of the pH measuring assembly and being arranged near the semi-permeable layer, the other electrode being disposed remote from said layer and connected to said circuit, said further electrode being connected with said endo-radiosonde for producing, in cooperation with the semi-permeable layer and said one electrode of said battery, a voltage which is variable with the change in pH concentration, and said one battery electrode and said further electrode being connected to said circuit to provide the latter with a variable voltage for transmitting information.

2. An endo-radiosonde according to claim 1, comprising an absorbent layer closely underlying the internal surface of the semi-permeable layer.

3. An endo-radiosonde according to claim 2, wherein said one electrode is disposed so closely to the semi-permeable layer that the absorbent layer is retained in position therebetween.

4. An endo-radiosonde according to claim 3, wherein said one electrode is arcuate in a plane parallel to the semi-permeable layer and at least almost entirely abuts against the absorbent layer for the purpose of satisfactorily mounting the absorbent layer.

5. An endo-radiosonde according to claim 4, wherein said one electrode is disk-shaped.

6. An endo-radiosonde according to claim 4, wherein said one electrode is annular.

7. An endo-radiosonde according to claim 4, wherein said housing and said one electrode are cylindrical.

8. An endo-radiosonde according to claim 1, wherein said housing defines a chamber in which said battery is disposed, said housing is cylindrical, said semi-permeable layer is arranged on the curved portion of the housing which is provided with at least one opening into the battery chamber, said one electrode is at least part of a cylindrical surface and is arranged near the cylindrical housing wall, and said other battery electrode is arranged to substantially coincide with the axis of the battery chamber.

9. An endo-radiosonde according to claim 8, wherein the absorbent layer is disposed between the housing wall, and the cylindrical electrode is arranged appropriately close to this housing wall.

10. In an endo-radiosonde for measuring the pH value internally of a living being and transmitting a signal equivalent to this value to a location external of the being, the improvement comprising, a housing having a first chamber accommodating the elements of a battery and a second chamber for accommodating a transmitting circuit, a pair of battery electrodes in said first chamber having portions thereof disposed in said second chamber for delivering a voltage sufficient to operate a transmitting circuit; a pH measuring assembly including one electrode of the battery and a further electrode disposed externally on the housing being wettable by intestinal fluids and connectable to a transmitting circuit for delivering a voltage thereto which may vary dependent upon the pH value; and a semi-permeable layer closing said first chamber, said one electrode of the battery being disposed in proximity to the layer and the other battery electrode being disposed remote therefrom.

References Cited in the file of this patent

FOREIGN PATENTS 1,248,684    France _____ Nov. 14, 1960

OTHER REFERENCES

"Endosondes: Further Notes" (Mackay), pp. 67–73, IRE Transactions on Medical Electronics, vol. ME-7, No. 2, April 1960.